(12) United States Patent
Vandermeijden et al.

(10) Patent No.: US 10,402,031 B2
(45) Date of Patent: Sep. 3, 2019

(54) METHOD AND SYSTEM FOR THERMAL DRIFT CORRECTION

(71) Applicant: Synaptics Incorporated, San Jose, CA (US)

(72) Inventors: Tom R. Vandermeijden, San Jose, CA (US); Sam Toba, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 67 days.

(21) Appl. No.: 15/823,491

(22) Filed: Nov. 27, 2017

(65) Prior Publication Data
US 2019/0163295 A1    May 30, 2019

(51) Int. Cl.
*G06F 3/044*      (2006.01)
*G06F 3/045*      (2006.01)
*G06F 3/041*      (2006.01)

(52) U.S. Cl.
CPC ............ *G06F 3/044* (2013.01); *G06F 3/045* (2013.01); *G06F 3/0412* (2013.01); *G06F 2203/04112* (2013.01)

(58) Field of Classification Search
CPC ........ G06F 3/044; G06F 3/0412; G06F 3/045; G06F 2203/04112
See application file for complete search history.

(56) References Cited

U.S. PATENT DOCUMENTS

| | | | |
|---|---|---|---|
| 9,740,341 B1* | 8/2017 | Rosenberg | G06F 3/04883 |
| 2013/0176271 A1* | 7/2013 | Sobel | G06F 3/041 345/174 |
| 2013/0176272 A1* | 7/2013 | Cattivelli | G06F 3/041 345/174 |
| 2013/0176273 A1* | 7/2013 | Li | G06F 1/3262 345/174 |
| 2013/0176274 A1* | 7/2013 | Sobel | G06F 3/0416 345/174 |
| 2013/0176275 A1* | 7/2013 | Weaver | G06F 3/0416 345/174 |
| 2015/0015539 A1* | 1/2015 | Fotopoulos | G06F 3/044 345/174 |
| 2017/0315653 A1* | 11/2017 | Vandermeijden | G06F 3/0416 |
| 2017/0315658 A1* | 11/2017 | Vandermeijden | G06F 3/0416 |

* cited by examiner

*Primary Examiner* — Dmitriy Bolotin
(74) *Attorney, Agent, or Firm* — Ferguson Braswell Fraser Kubasta PC

(57) ABSTRACT

A method includes obtaining various resistance measurements of a sensor electrode in an input device, where the resistance measurements correspond to electrical resistance values across the sensor electrode. The method further includes obtaining a capacitive response using various sensor electrodes in the input device, where the capacitive response corresponds to changes in capacitance in response to an input object being located in a sensing region. The method further includes determining an adjusted capacitive response using the resistance measurements and the capacitive response. The method further includes determining, using the adjusted capacitive response, object information regarding the input object in the sensing region.

20 Claims, 9 Drawing Sheets

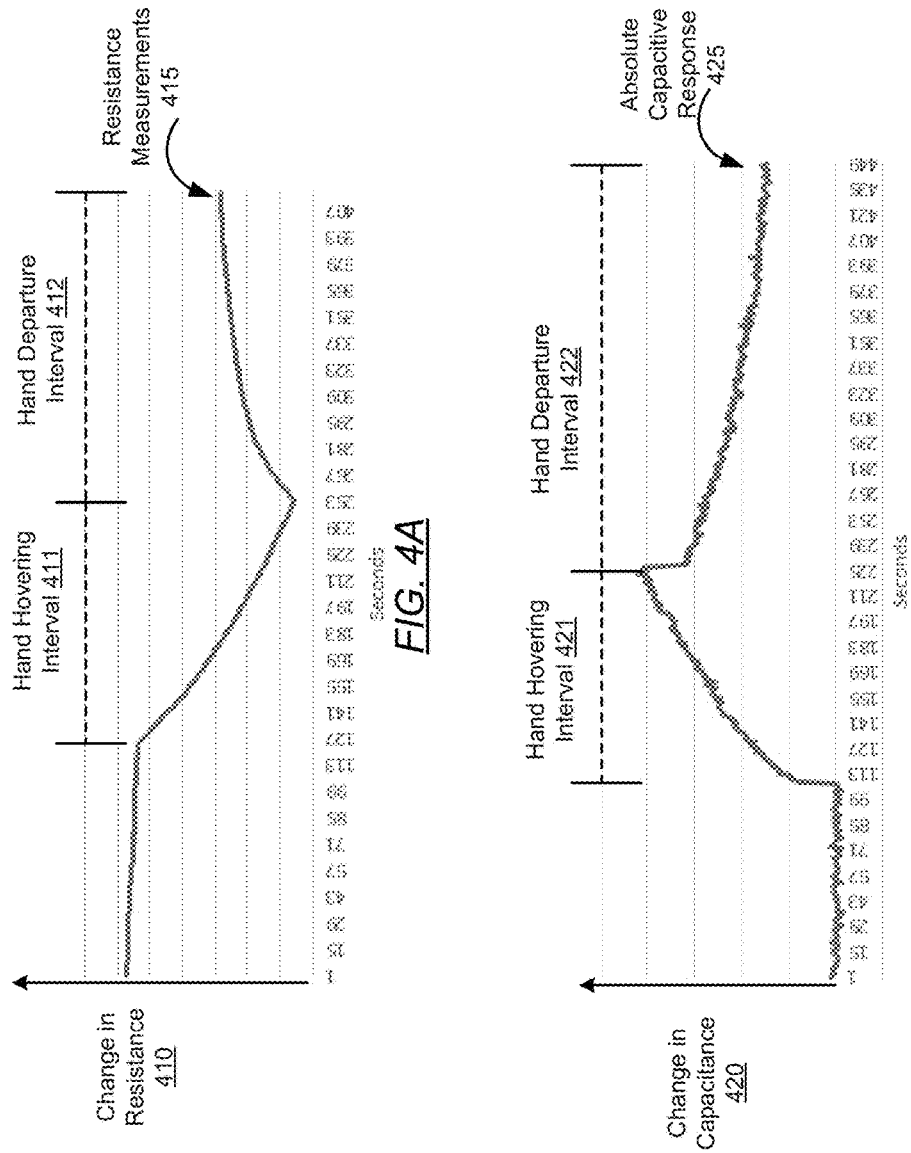

METHOD AND SYSTEM FOR THERMAL DRIFT CORRECTION

FIELD

This disclosed technology generally relates to electronic devices and specifically to capacitive sensing devices.

BACKGROUND

Input devices, including proximity sensor devices (e.g., touchpads, touch sensor devices, etc.), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

During operation of a proximity sensing device, heat from outside sources may alter the underlying circuitry. Accordingly, various system baselines for measuring an input object response may become unreliable while performing proximity sensing.

SUMMARY

In general, in one aspect, the disclosed technology relates to a processing system. The processing system includes sensor circuitry configured to obtain various resistance measurements of a sensor electrode in an input device, wherein the resistance measurements correspond to electrical resistance values across the sensor electrode. The sensor circuitry is further configured to obtain a capacitive response using various sensor electrodes in the input device, wherein the capacitive response corresponds to changes in capacitance in response to an input object being located in a sensing region. The processing system further includes a determination module coupled to the sensor circuitry. The determination module is configured to determine an adjusted capacitive response using the resistance measurements and the capacitive response. The determination module is further configured to determine, using the adjusted capacitive response, object information regarding the input object in the sensing region.

In general, in one aspect, the disclosed technology relates to an input device that includes various sensor electrodes that include a sensor electrode. The input device further includes a processing system coupled to the sensor electrodes. The processing system is configured to obtain various resistance measurements of the sensor electrode, wherein the resistance measurements correspond to electrical resistance values across the sensor electrode. The processing system is further configured to obtain a capacitive response using the sensor electrodes, wherein the capacitive response corresponds to changes in capacitance in response to an input object being located in a sensing region. The processing system is further configured to determine an adjusted capacitive response using the resistance measurements and the capacitive response. The processing system is further configured to determine, using the adjusted capacitive response, object information regarding the input object in the sensing region.

In general, in one aspect, the disclosed technology relates to a method that includes obtaining various resistance measurements of a sensor electrode in an input device, wherein the resistance measurements correspond to electrical resistance values across the sensor electrode. The method further includes obtaining a capacitive response using various sensor electrodes in the input device, wherein the capacitive response corresponds to changes in capacitance in response to an input object being located in a sensing region. The method further includes determining an adjusted capacitive response using the resistance measurements and the capacitive response. The method further includes determining, using the adjusted capacitive response, object information regarding the input object in the sensing region.

Other aspects of the disclosed technology will be apparent from the following description and the appended claims.

BRIEF DESCRIPTION OF DRAWINGS

FIG. 4A shows example resistance measurements in accordance with one or more embodiments.

FIG. 4B shows an example capacitive response in accordance with one or more embodiments.

DETAILED DESCRIPTION

Figure 1:
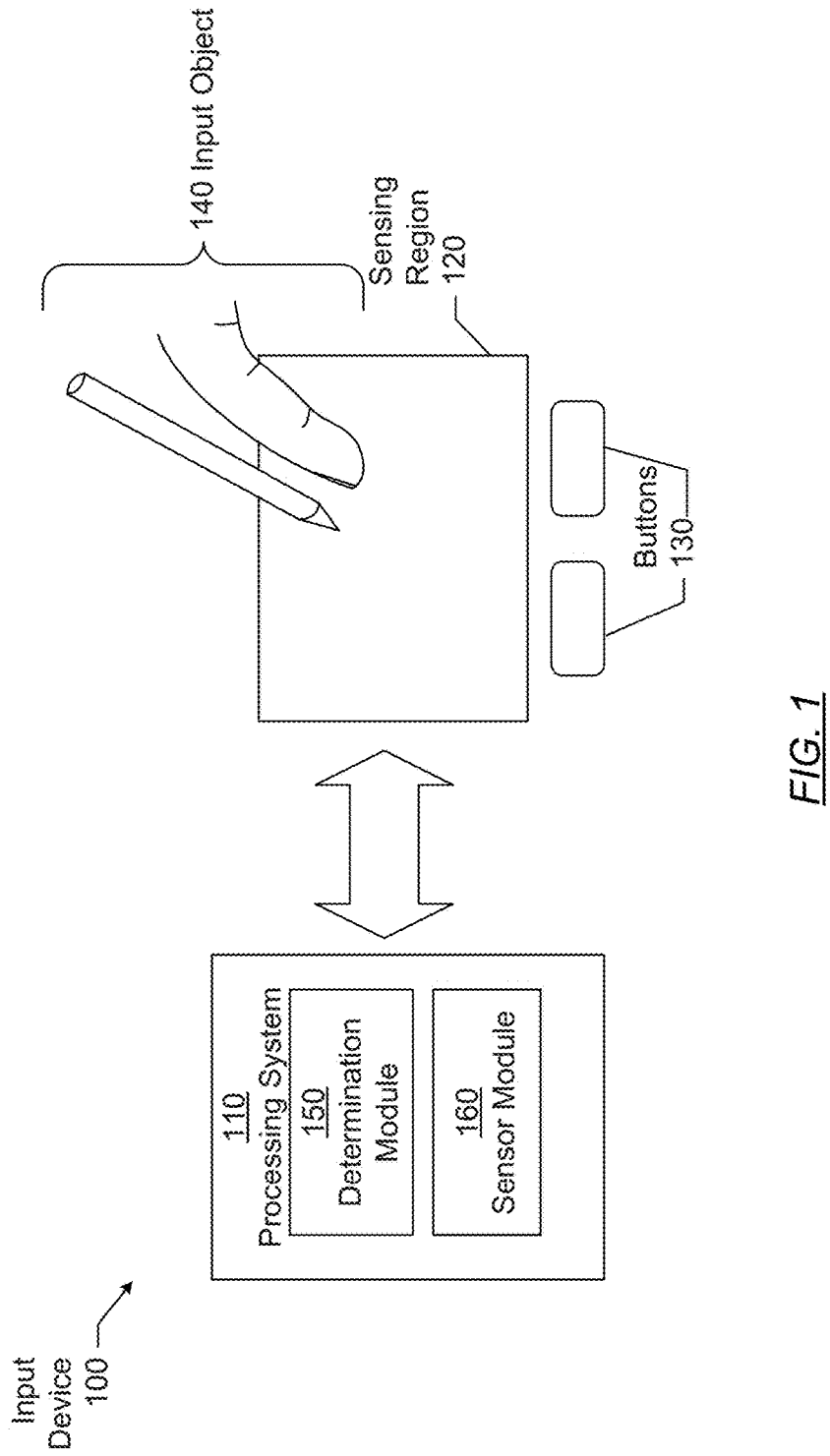
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability for capacitive imaging. In particular, one or more embodiments of the disclosed technology are directed to providing a method for adjusting a capacitive response to account for thermal drift in an input device. Specifically, a capacitive response may include various capacitance values that correspond to particular characteristics of an input object in a sensing region. Due to the presence of a heat source, e.g., a user's face or heat generated by a display, thermal drift may shift respective capacitance values such that accurate object information can no longer be detected with respect to the input object. However, using resistance measurements of various sensor electrodes or another signal that correlates to the amount of thermal drift, a detected capacitive response may be adjusted to correct for the thermal drift.

In some embodiments, for example, changes in resistance across capacitive sensing electrodes provide an adjustment criterion for modifying a capacitive baseline. The modified capacitive baseline may then be used to detect changes in capacitances between one or more input objects and the capacitive sensing electrodes.

Moreover, for absolute capacitive sensing, face-detection presents various problems for an input device. At distances of 5 cm or more, for example, an input device may detect plenty of capacitive signals in a capacitive response, but drift with respect to the capacitive baseline may make any such face-detection unreliable. Therefore, in some embodiments, the disclosed technology provides methods and systems to address thermal drift associated with persistent warm objects (e.g., a user's face during a phone call) and other heat sources that simultaneously interact with an input device during capacitive sensing operations.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). An example electronic system (or "electronic devices") may be a system capable of electronically processing information. Non-limiting examples of electronic systems include personal computing devices (e.g., desktop computers, laptop computers, netbook computers, tablets, web browsers, e-book readers, and personal digital assistants (PDAs), composite input devices (e.g., physical keyboards, joysticks, and key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the corresponding electronic system, or may be physically separated from the electronic system. The input device (100) may be coupled to (and communicate with) components of the electronic system using various wired and/or wireless interconnection and communication technologies, such as buses and networks. Example communication technologies may include Inter-Integrated Circuit ($I^2C$). Serial Peripheral Interface (SPI), PS/2, Universal Serial Bus (USB), Bluetooth®, Infrared Data Association (IrDA), and various radio frequency (RF) communication protocols defined by the IEEE 802.11 and other standards.

In FIG. 1, the input device (100) may correspond to a proximity sensor device (e.g., also referred to as a "touchpad" or a "touch sensor device") configured to sense input provided by one or more input objects (140) in a sensing region (120). Example input objects include fingers, styli, active pen, fingertips, and the like. Throughout the specification, the singular form of input object may be used although multiple input objects may exist in the sensing region (120). Further, the particular input objects in the sensing region may change over the course of one or more gestures.

The sensing region (120) encompasses any space above, around, in, and/or proximate to the input device (100) in which the input device (100) is able to detect user input (e.g., user input provided by one or more input objects (140)). The sizes, shapes, and locations of particular sensing regions may vary depending on actual implementation.

In some embodiments, the sensing region (120) may extend from a surface of the input device (100) in one or more directions into space until signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and the accuracy desired. In some embodiments, the sensing region (120) may detect inputs involving no physical contact with any surfaces of the input device (100), contact with an input surface (e.g., a touch surface and/or screen) of the input device (100), contact with an input surface of the input device (100) coupled with some amount of applied force or pressure, and/or a combination thereof. In some embodiments, input surfaces may be provided by, and/or projected on, one or more surfaces of a housing of the input device (100) (e.g., as an image). For example, the sensing region (120) may have a rectangular shape when projected onto an input surface of the input device (100). In some implementations, inputs may be provided through images that span one, two, three, or higher-dimensional spaces in the sensing region (120). In some implementations, inputs may be provided through projections along particular axes or planes in the sensing region (120). Further, in some implementations, inputs may be provided through a combination of one or more images and one or more projections in the sensing region (120).

The input device (100) may utilize any combination of sensor components and sensing technologies to detect user input in the sensing region (120). Example sensing technologies may include capacitive, elastive, resistive, inductive, magnetic, acoustic, ultrasonic, and/or optical sensing technologies.

In some embodiments, the input device (100) may utilize resistive sensing technologies to detect user inputs. For example, the sensing region (120) may be formed by a flexible and conductive first layer, separated by one or more spacer elements, from a conductive second layer. The sensing region (120) may detect user input by creating one or more voltage gradients are created across the layer, and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information about the detected inputs.

In some other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user inputs based on a combination of the magnitude, phase, and/or frequency of the currents. The characteristics of the loop currents may further be used to determine positional information about the detected inputs.

Still further, in some embodiments, the input device (100) may utilize capacitive sensing technologies to detect user inputs. For example, the sensing region (120) may include one or more capacitive sensing elements (e.g., sensor electrodes) to create an electric field. The input device (100) may detect inputs based on changes in capacitance of the sensor electrodes. For example, an object in contact with (or in close proximity to) the electric field may cause changes in the voltage and/or current in the sensor electrodes. Such changes in voltage and/or current may be detected as "signals" indicative of user inputs.

The sensor electrodes may be arranged in arrays or other configurations to detect inputs at multiple points within the sensing region (120). In some implementations, separate sensing electrodes may be ohmically shorted together to form larger sensor electrodes. Some capacitive implementations may utilize resistive sheets that provide a uniform layer of resistance.

Some capacitive implementations utilize "self capacitance" (or "absolute capacitance") sensing methods based on changes in the capacitive coupling between sensor electrodes and an input object. For example, an input object near the sensor electrodes may alter the electric field near the sensor electrodes, thus changing the measured capacitive coupling. In some embodiments, the input device (100) may implement absolute capacitance sensing by modulating sensor electrodes with respect to a reference voltage (e.g., system ground), and detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "transcapacitance") sensing methods based on changes in the capacitive coupling between sensor electrodes. For example, an input object near the sensor electrodes may alter the electric field between the sensor electrodes, thus changing the measured capacitive coupling. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to the receiver sensor electrodes. For example, the transmitter sensor electrodes may be modulated relative to a reference voltage to transmit signals, while the receiver sensor electrodes may be held at a substantially constant voltage to facilitate receipt of resulting signals. The resulting signal received by the receiver sensor electrodes may be affected by environmental interference (e.g., from other electromagnetic signals and/or objects in contact with, or in close proximity to, the sensor electrodes). In some aspects, each sensor electrode may be a dedicated transmitter, a dedicated receiver, or configured to both transmit and receive. Measurements acquired using mutual capacitance sensing methods may be referred to as mutual capacitance measurements.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) may include electronically-readable instructions, such as firmware code, software code, and/or the like. In some embodiments, components composing the processing system (110) are co-located, for example, in close proximity to the sensing element(s) of the input device (100). In other embodiments, one or more components of the processing system (110) are physically separate from the sensing element(s) of the input device (100). For example, the input device (100) may be a peripheral coupled to a computing device, and the processing system (110) may be implemented as software executed by a central processing unit (CPU) of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may be configured to determine when at least one input object is in a sensing region, determine signal to noise ratio, determine positional information of an input object, identify a gesture, determine an action to perform based on the gesture, a combination of gestures or other information, and/or perform other operations.

The sensor module (160) may be configured to drive the sensing elements to transmit transmitter signals and receive the resulting signals. For example, the sensor module (160) may include sensor circuitry, such as driving circuitry or receiver circuitry, which is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

The processing system (110) may include alternative or additional modules corresponding to distinct modules or sub-modules of one or more of the modules discussed above. For example, alternative or additional modules may include hardware operation modules configured to operate hardware such as sensor electrodes and display screens, data processing modules configured to process data such as sensor signals and positional information, reporting modules configured to report information, identification modules configured to identify gestures such as mode changing gestures, and mode changing modules configured to change operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

The processing system (110) may operate the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes and/or perform filtering or other signal conditioning on the received signals. In some embodiments, the processing system (110) may subtract or otherwise account for a baseline associated with the sensor electrodes. For example, the baseline may represent a state of the sensor electrodes when no user input is detected. Accordingly, the information provided by the processing system (110) to the electronic system may reflect a difference between the electrical signals received from the sensor electrodes and the baseline associated with each sensor electrode. In some embodiments, the processing system (110) may determine positional information for detected input, recognize inputs as commands, recognize handwriting, and the like.

The term "positional information" as used herein refers to any information describing other otherwise indicating a position or location of the detected input (e.g., within the sensing region (120)). Example positional information includes absolute position, relative position, velocity, acceleration, and/or other types of spatial information. The term "zero-dimensional" positional information may include how near/far an object is to the sensing region (120), or whether or not the object is in contact with the sensing region (120). The term "one-dimensional" positional information refers to information describing a position of the detected input along a particular axis. The term "two-dimensional" positional information refers to information describing a position or motion of the detected input in a plane. The term "three-dimensional" positional information refers to information describing a position, or instantaneous or average velocities of the detected input in space. Further examples of positional information may include other representations of spatial information, for example, historical data tracking position, movement, or instantaneous velocity of the detected input over time.

In some embodiments, the input device (100) includes a touch screen interface (e.g., display screen) that at least partially overlaps the sensing region (120). For example, the sensor electrodes of the input device (100) may form a substantially transparent overlay on the display screen, thereby providing a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, one or more of the sensor electrodes may be configured for both display updating and input sensing.

While FIG. 1 shows a configuration of components, other configurations may be used without departing from the scope of the disclosure. For example, various components may be combined to create a single component. As another example, the functionality performed by a single component may be performed by two or more components. Accordingly, for at least the above-recited reasons, embodiments of the disclosure should not be considered limited to the specific arrangements of components and/or elements shown in FIG. 1.

Figure 2A:
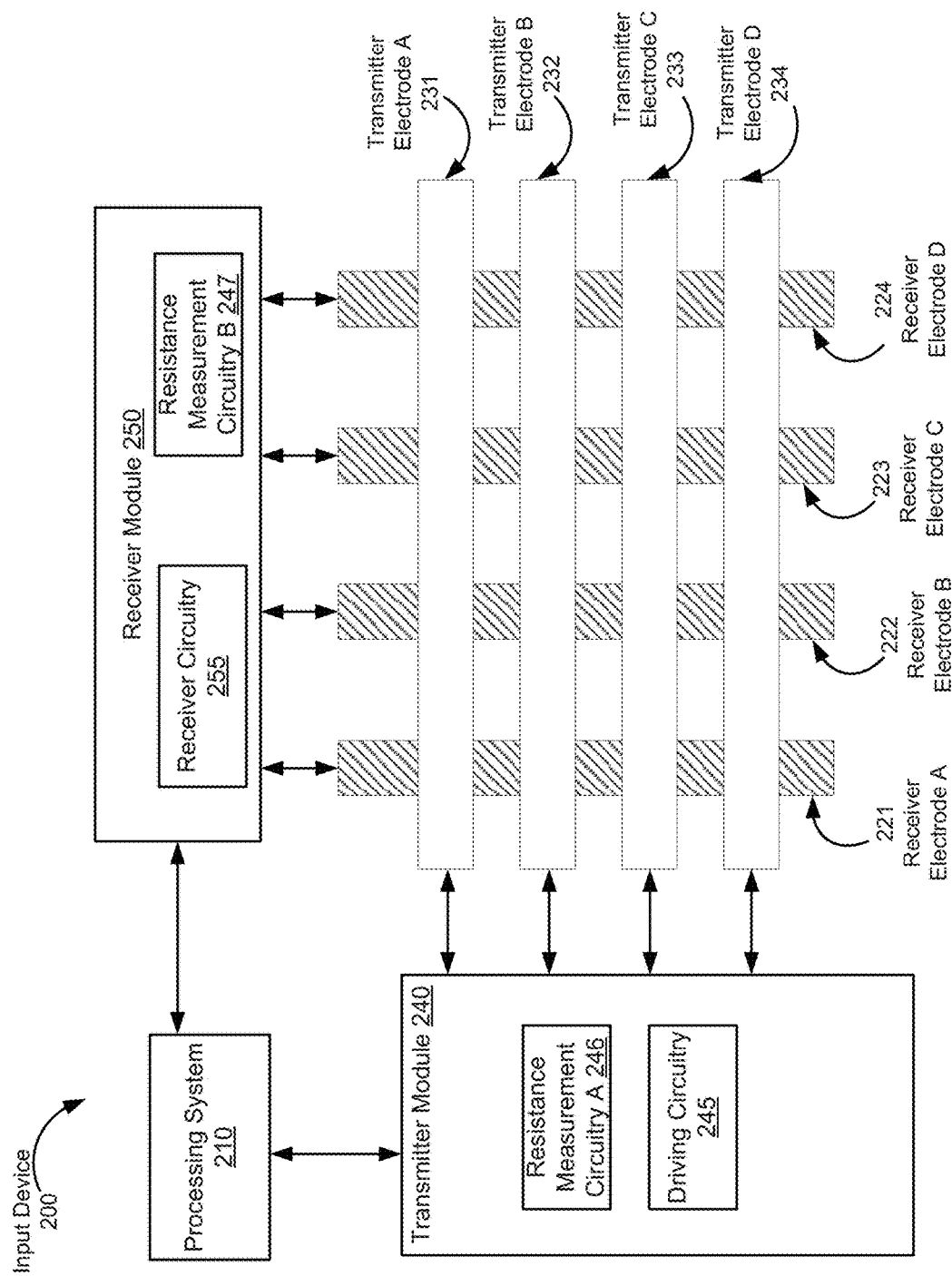
FIG. 2A shows a schematic view of an input device in accordance with one or more embodiments.

Turning to FIG. 2A, FIG. 2A shows a schematic view of an input device (200) in accordance with one or more embodiments. As shown in FIG. 2A, the input device (200) may include a receiver module (250), a transmitter module (240), and a processing system (210). The processing system (210) may be similar to processing system (110) described in FIG. 1 and the accompanying description and/or computing system (700) described in FIG. 7 and the accompanying description. The transmitter module (240) may include driving circuitry (245) that may be similar to transmitter circuitry described in FIG. 1 and the accompanying description. For example, driving circuitry (245) may include hardware and/or software that are configured to generate one or more sensing signals transmitted over one or more transmitter electrodes (e.g., transmitter electrode A (231), transmitter electrode B (232), transmitter electrode C (233), transmitter electrode D (234)). The transmitter electrodes (231, 232, 233, 234) may be similar to the transmitter electrodes described in FIG. 1 and the accompanying description.

Moreover, the receiver module (250) may include receiver circuitry (255). For example, receiver circuitry (255) may include hardware and/or software that are configured to obtain one or more resulting signals from one or more receiver electrodes (e.g., receiver electrode A (221), receiver electrode B (222), receiver electrode C (223), receiver electrode D (224)) in response to one or more sensing signals transmitted over the transmitter electrodes (231, 232, 233, 234). Likewise, the resulting signals may detect changes in a variable capacitance between one or more of the receiver electrodes (221, 222, 223, 224) and one or more input objects in a sensing region. The receiver circuitry (255) may be similar to the sensor circuitry described in FIG. 1 and the accompanying description. In particular, the receiver circuitry (255) may include analog-front ends, which may further include various analog conditioning circuitry, such as operational amplifiers, digital-signal processing components, filters, and various application-specific integrated circuits for detecting and analyzing resulting signals obtained from the receiver electrodes (221, 222, 223, 224). Likewise, the receiver electrodes (221, 222, 223, 224) may be similar to the receiver electrodes described in FIG. 1 and the accompanying description.

In one or more embodiments, the receiver module (250) and/or the transmitter module (240) include resistance measurement circuitry (e.g., resistance measurement circuitry A (246), resistance measurement circuitry B (247)). Specifically, resistance measurement circuitry may include hardware and/or software configured for obtaining and/or analyzing resistance signals corresponding to a portion of the input device (200). For example, a resistance signal may be an electrical signal that corresponds to a resistance measurement based on changes in voltage and/or changes in current across one or more sensor electrodes in the input device (200). Thus, a processing system may use the resistance signal to determine resistance or impedance values associated with a portion of the input device (200). Resistance values and/or impedance values may be absolute values, relative values, e.g., with respect to a resistance baseline, and/or a range of values.

Figure 2B:
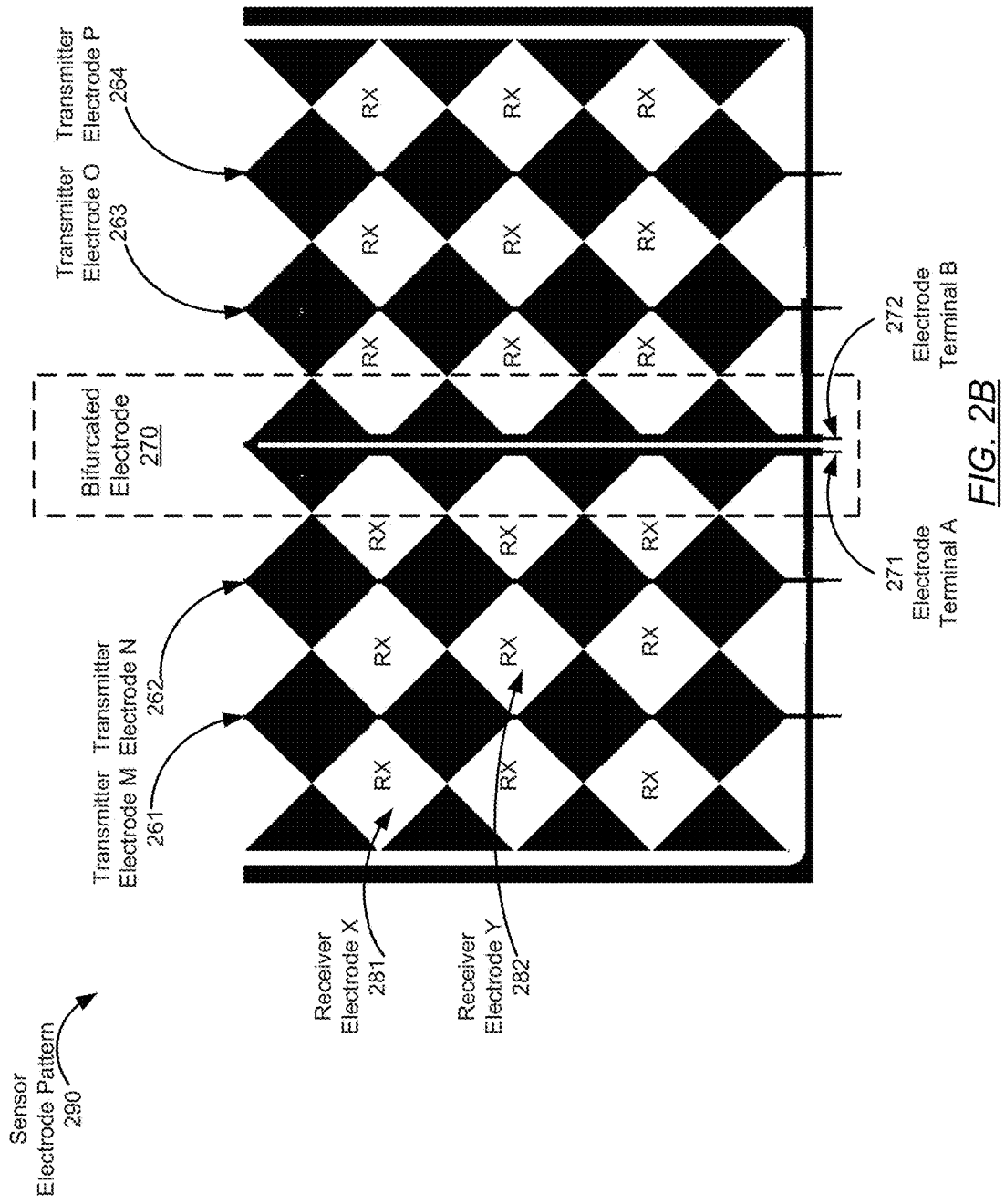
FIG. 2B shows a schematic view of a sensor electrode pattern in accordance with one or more embodiments.

Turning to FIG. 2B, FIG. 2B shows a schematic view of a sensor electrode pattern in an input device in accordance with one or more embodiments. As shown in FIG. 2B, in some embodiments, sensor electrodes are plates within a sensor electrode pattern (290) that form diamond shapes. For example, various transmitter electrodes (e.g., transmitter electrode A (261), transmitter electrode B (262), transmitter electrode C (263), transmitter electrode D (264)) may be disposed adjacent to various receiver electrodes (e.g., receiver electrode A (281), receiver electrode B (282)) labeled in FIG. 2B as RX. In particular, the sensor electrode pattern (290) may include diamond-shaped plates closely spaced and interleaved, so that each diamond-shaped plate of rows may have at least two edges (and in many cases four edges) which are adjacent to diamond shape plates of various columns of the sensor electrode pattern (290). This interleaving may allow for symmetric coupling from an input object to the sensor electrodes, and for mostly space filling (e.g., on a single layer) with minimized overlap where they cross (e.g., with jumpers).

In one or more embodiments, the sensor electrode pattern (290) includes one or more bifurcated electrodes (e.g., bifurcated electrode (270)). For example, a bifurcated electrode may be a sensor electrode that include various electrode terminals (e.g., electrode terminal A (271), electrode terminal B (272)) for measuring resistance across the bifurcated electrode. In particular, one or more bifurcated electrodes may be located in a central regional of the sensor electrode pattern (290). Moreover, the electrode terminals (271, 272) may be accessible along a printed circuit board with traces to silicon. In some embodiments, bifurcated electrodes may provide resistance measurements where the resistance measurements are substantially unaffected by input forces applied to an input device having the sensor electrode pattern (290).

Keeping with FIG. 2B, a bifurcated electrode (270) may be disposed along a major axis of an input device, for example, parallel to transmitter electrodes in the sensor electrode pattern (290). When the bifurcated electrodes measure resistance, one electrode terminal in the bifurcated electrode (270) may be an anode and another electrode terminal may be a cathode. For absolute capacitive sensing with the bifurcated electrode (270), absolute capacitive measurements may be obtained in an absolute capacitive mode using an analog switch (not shown) that short-circuits both electrode terminals (271, 272). Likewise, when the bifurcated electrode (270) operates in a transcapacitive mode, the electrode terminals (271, 272) may be short-circuited together for transmitting sensing signals. For resistance measuring with the bifurcated electrode (270), a resistance signal may be obtained in a resistance-measuring mode when the analog switch is designated as an open-circuit. Accordingly, the resistance signal obtained across the bifurcated electrode (270) may correspond to a resistance level of the bifurcated electrode (270).

Furthermore, an input device may include sensor electrodes that are disposed in a matrix electrode array (also called an "Advanced Matrix Pad" or AMP) where each sensor electrode may be referred to as a matrix sensor electrode. For example, a matrix sensor electrode may include at least two separate routing traces coupled to a processing system, e.g., for operating the matrix sensor electrode as a transmitter electrode or receiver electrode. As such, each matrix sensor electrode may also measure resistance using the multiple routing traces.

Figure 3:
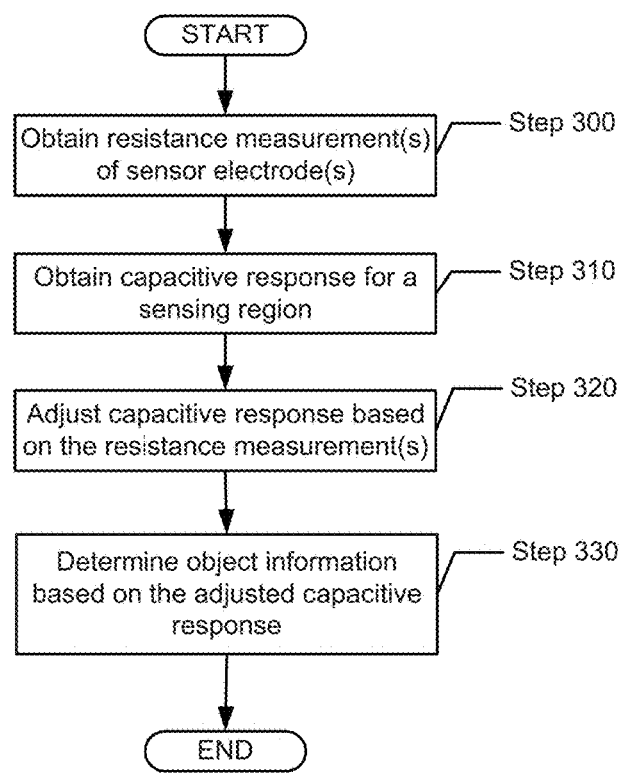
FIG. 3 shows a flowchart illustrating a method for operating an input device in accordance with one or more embodiments.

Turning to FIG. 3, FIG. 3 shows a flowchart illustrating a method for operating an input device in accordance with one or more embodiments. The process shown in FIG. 3 may involve, for example, one or more components discussed above in reference to FIGS. 1, 2A, and 2B (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, one or more resistance measurements are obtained for one or more sensor electrodes in accordance with one or more embodiments. In particular, a processing system may obtain one or more resistance signals corresponding to electrical resistance values of various sensor electrodes. For example, a resistance signal may be an electrical signal that measures a resistance value or a change in resistance with respect to the sensor electrodes. Thus, the resistance measurements may be electrical resistance values and/or further processed resistance values that describe a change in resistance. Likewise, resistance measurements may include a profile generated corresponding to one or more resistance signals obtained for an input device. Moreover, resistance signals may correspond to a difference between a resistance measurement over a particular time interval and a resistance baseline. For more information on resistance baselines, see Step 500 in FIG. 5 below and the accompanying description.

Furthermore, a resistance measurement may provide a measure of thermal drift regarding a heat source around an input device. For example, a heat source may be an open hand and/or a user's face. Likewise, a heat source may include heat produced by a display device coupled to the input device, e.g., a backlight and/or display electrodes in an LCD screen may generate heat within an input device. The type of heat source may be irrelevant as changes in capacitive sensing may be produced by changes in heat within the input device and not necessarily the origin or type of heat.

Furthermore, the sensor electrodes may include (ITO) or metal-mesh electrodes, such as the sensor electrodes described above in FIGS. 1, 2A and 2B and the accompanying description. In one or more embodiments, the sensor electrodes are bifurcated electrodes. In some embodiments, the location and dimensions of routing traces among the sensor electrodes are configured to minimize susceptibility of capacitive measurements to heat sources. When a user's hand grips a touchscreen, for example, reducing the distance that routing traces travel between the sensor electrodes and the processing system may reduce the effects of heat from the user's hand. More routing trace distance may increase the chance that a respective routing trace overlaps an area affected by the user's hand.

Turning to FIG. 4A, FIG. 4A illustrates resistance measurements (415) in accordance with one or more embodiments. In FIG. 4A, the vertical axis corresponds to changes in resistance (410) at a particular sensor electrode while the horizontal axis corresponds to a time interval. As shown in FIG. 4A, a user's hand hovers over an input surface of an input device during a hand hovering interval (411). During the hand hovering interval (411), the user's hand is heating the input device and thus produces a negative change in the resistance of the respective sensor electrode as reflected in the resistance measurements (415). Following the hand hovering interval (411), the user's hand exits the sensing region of the input device and thereby allows the input device to cool. Thus, as shown in a hand departure interval (412) where the user's hand is no longer heating the input device, the resistance measurements (415) increase toward the original resistance level of the sensor electrode.

Returning to FIG. 3, in Step 310, a capacitive response is obtained for a sensing region in accordance with one or more embodiments. In particular, the capacitive response may be obtained from various resulting signals in a capacitive scan. For example, the capacitive response may include various capacitive pixel values corresponding to respective sensor pixels along different locations of one or more sensor electrodes. Likewise, the capacitive response may correspond to absolute capacitive measurements regarding differences in capacitance between one or more sensor electrodes and one or more input objects in a sensing region. In some embodiments, the capacitive response may be obtained from various resulting signals as described in FIGS. 1 and 2A and the accompanying description.

Furthermore, a capacitive response may be obtained by an input device at a different time in a capacitive sensing sequence than resistance measurements. For example, during a particular frame in the capacitive sensing sequence, a processing system may perform a capacitive scan. In a different frame in the capacitive sensing sequence, the processing system may obtain various resistance signals to measure the resistance at the same sensor electrode. In another frame, the same sensor electrode may be designated for a different operation, for example, as a common electrode for updating one or more display pixels within a touchscreen.

In some embodiments, resistance is measured in a different sensor electrode used for the capacitive response. For example, an adjacent sensor electrode to a capacitive response sensor electrode may provide the resistance measurement. In some embodiments, for example, an input device can measure resistance at location A to compensate for capacitive sensing in location B. On the other hand, in some embodiments, the resistance measurements use the same sensor electrodes as used to obtain the capacitive response.

Turning to FIG. 4B, FIG. 4B illustrates an absolute capacitive response (425) in accordance with one or more embodiments. FIG. 4B shows the capacitive response produced by the same user's hand that produce the resistance measurements (415) as shown in FIG. 4A. In FIG. 4B, the vertical axis corresponds to changes in capacitance (420) measured at a particular sensor electrode while the horizontal axis corresponds to an overlapping time interval with FIG. 4A. As shown in FIG. 4B, a user's hand hovers over an input surface during a hand hovering interval (421). During the hand hovering interval (421), an input device measures changes in capacitance resulting from the user's hand as reflected in the absolute capacitive response (425). However, while the user's hand maintains the same separation distance between sensor electrodes throughout the hand hovering interval (421), the measured change in capacitance continues to increase throughout the hand hovering interval (421) as a result of temperature changes in the input device. Thus, as shown in a hand departure interval (422) where the user's hand is no longer proximate the input device, the absolute capacitive response (425) results in an immediate drop in response to the user's hand departure along with a gradual decrease in the capacitive change through the remaining hand departure interval (422).

Returning to FIG. 3, in Step 320, a capacitive response is adjusted based at least in part on one or more resistance measurements in accordance with one or more embodiments. In particular, a processing system may apply a gain factor to a capacitive response to obtain an adjusted capacitive response. The gain factor may be a linear function or a more complex algorithm. As such, the capacitive response may be corrected for thermal drift to produce an adjusted capacitive response resembling a capacitive signal unaffected by a heat source. Likewise, an input device may perform various filtering, data processing, and other signal conditioning techniques to generate the adjusted capacitive response.

In some embodiments, a transcapacitive response is adjusted using resistance measurements from one or more transmitter electrodes and one or more receiver electrodes. For example, at the intersection of a transmitter electrode and a receiver electrode may be one tixel, i.e., a thermal pixel. Thus, a tixel may be compensated for thermal drift using resistance measurements of both receiver electrodes and transmitter electrodes. Likewise, based on the resistance measurements for a respective tixel, other tixels in the same sensor electrode row and/or sensor electrode column may also be compensated.

Figure 4C:
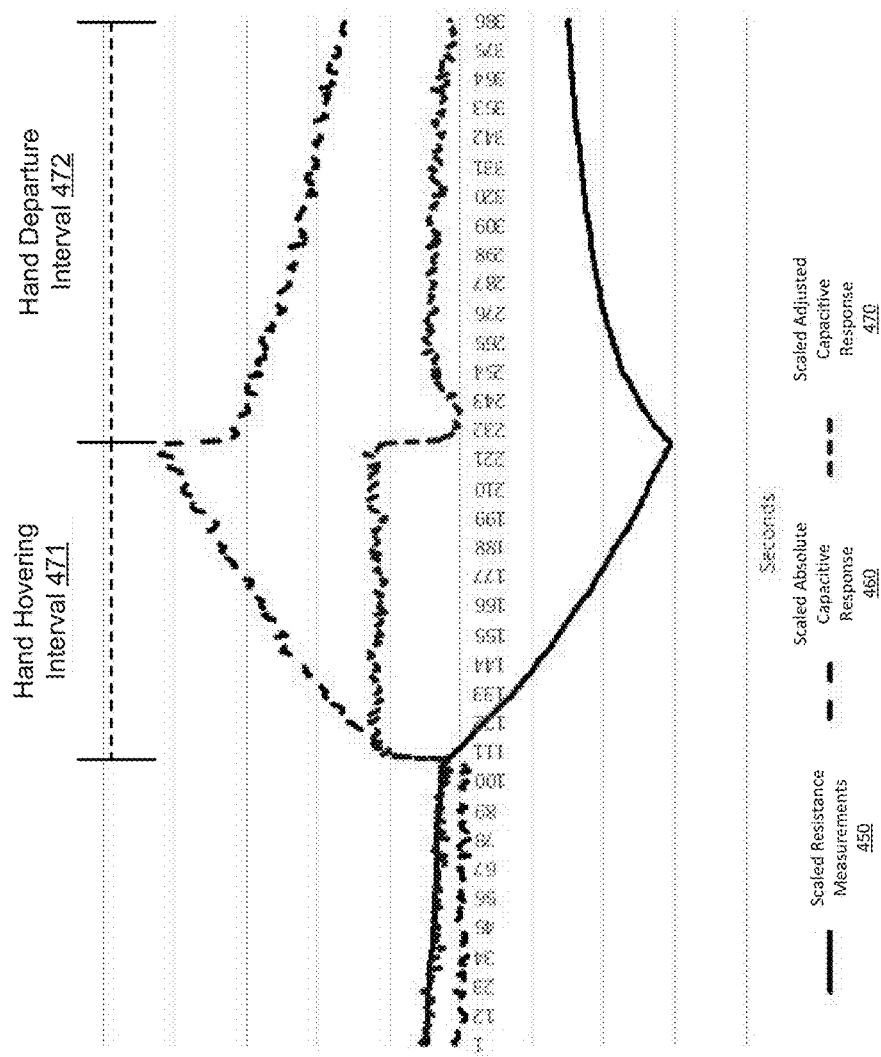
FIG. 4C shows an overlay of various example responses in accordance with one or more embodiments.

Turning to FIG. 4C, FIG. 4C illustrates an overlay of a resistance measurements, a capacitive response, and an adjusted capacitive response in accordance with one or more embodiments. FIG. 4C shows various scaled versions (i.e., scaled resistance measurements (460), scaled absolute capacitive response (470)) of the resistance measurements (415) from FIG. 4A and the absolute capacitive response (425) from FIG. 4B. Furthermore, FIG. 4C also includes a scaled adjusted absolute capacitive response (480) generated using thermal drift compensation. In particular, the scaled adjusted absolute capacitive response (480) is compensated for changes in capacitance produced by heat associated with the input device during the hand hovering interval (471) and the hand departure interval (472). For example, when the hand departs during the hand departure interval (472), the scaled adjusted absolute capacitive response (480) is also compensated for the slow dissipation of heat back to the input device's original temperature. Thus, the scaled adjusted absolute capacitive response (480) may provide a representative signal for determining object information of the user's hand in contrast to the scaled absolute capacitive response (470). FIGS. 4A, 4B, and 4C are intended only for illustrative purposes of the disclosed technology. The figures are not intended to reflect actual physical measurements, experimental or otherwise.

Returning to FIG. 3, in Step 330, object information is determined based on an adjusted capacitive response in accordance with one or more embodiments. For example, object information may include positional information similar to the positional information described in FIG. 1 and the accompanying description. Object information may also include various characteristics of an input object, such as input object size and/or the type of input object, e.g., whether an input object is an index finger, a palm, a user's face, stylus, etc. As such, a processing system may compare values obtained from an adjusted capacitive response with templates and/or threshold values to determine the object information.

In some embodiments, the embodiments described with respect to FIG. 4 above eliminate one or more infrared (IR) proximity sensors in an electronic system. Specifically, a resistance-based capacitive sensing adjustment may provide a replacement for detecting the presence of a human ear next to a touch screen during a phone call. For example, some IR proximity sensors are used in smartphones to detect the presence of a human ear to disable the display and the touch sensor to during the phone call to conserve power. By eliminating the IR-based proximity sensor with a capacitive sensing solution, additional power consumption may be reduced during the phone call. Likewise, IR sensors may produce high electronic system costs, blind zones, and inaccuracies due to the accumulation of dirt. IR sensors may also provide unreliable performance based on hair and skin color variations that capacitive sensing does not experience.

In some embodiments, an input device uses a non-resistance signal to compensate a capacitive response for thermal drift. For example, an input device may obtain temperature measurements in lieu of resistance measurements. As such, the input device may perform an adjustment based on various thermal measurements to correct for thermal drift in the input device. Likewise, the methods applied in FIG. 3 above and FIG. 5 below may apply to any drift-measuring signal that is responsive to changes in capacitance produced at least in part on thermal drift.

Figure 5:
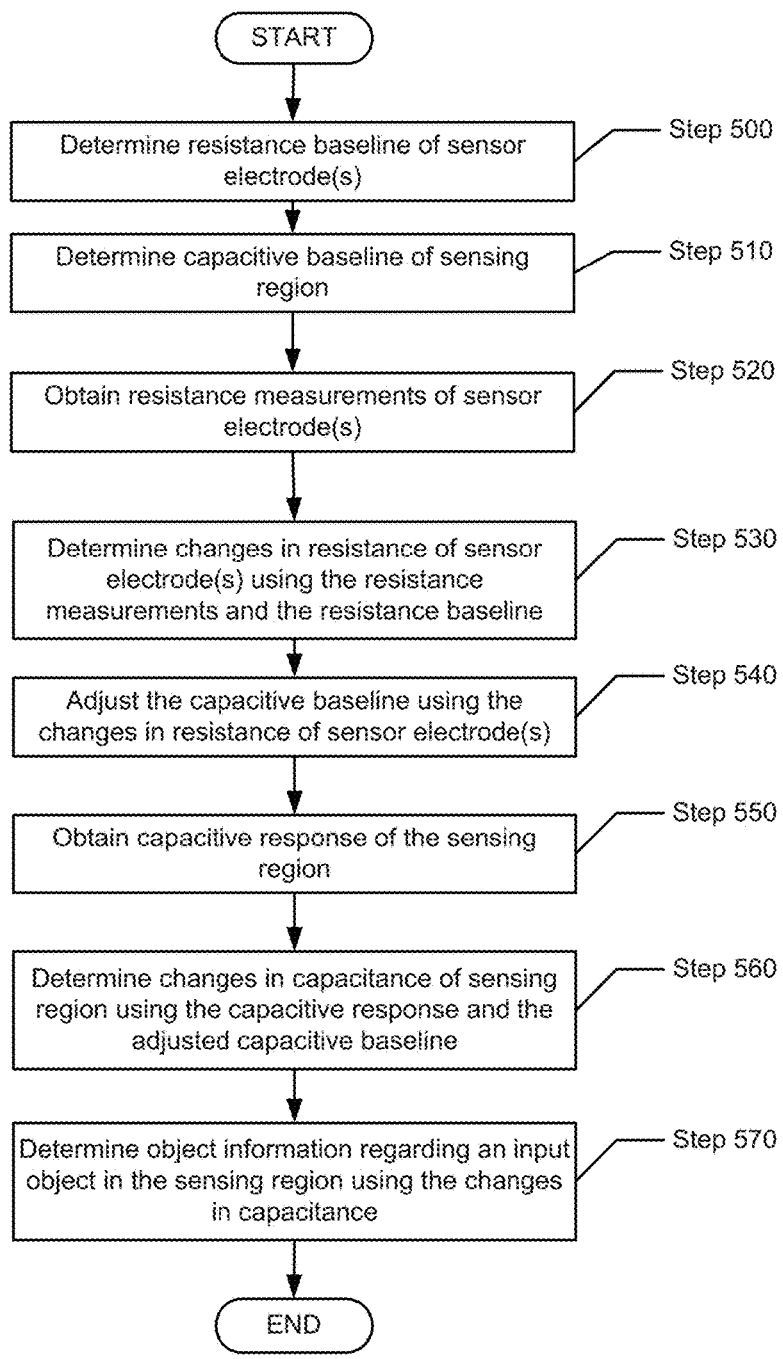
FIG. 5 shows a flowchart illustrating a method for operating an input device in accordance with one or more embodiments.

Turning to FIG. 5, FIG. 5 shows a flowchart illustrating a method for operating an input device in accordance with one or more embodiments. The process shown in FIG. 5 may involve, for example, one or more components discussed above in reference to FIGS. 1, 2A, and 2B (e.g., processing system (110)). While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 500, a resistance baseline of one or more sensor electrodes is determined in accordance with one or more embodiments. A resistance baseline may be a value or range of values that provide a metric for measuring changes in resistance in an input device. For example, a processing system may obtain resistance measurements regarding one or more sensor electrodes during a predetermined time where no thermal drift is detected. Accordingly, future resistance signals and/or resistance measurements may be analyzed in comparison to the resistance baseline in order to adjust a capacitive response and/or capacitive baseline. In some embodiments, for example, the resistance baseline is set when no input object is detected in a sensing region, e.g., when no finger is found hovering over the input device or no user's hand is found gripping the input device.

In some embodiments, the resistance baseline is adjusted periodically. For example, when an input object is detected leaving a sensing region, a new resistance baseline may be designated using one or more resistance signals. Likewise, a resistance baseline may correspond to a conditional resistive relaxation function based on an input object's location, e.g., one location in a sensing region may have a different resistance baseline value than another location in the same sensing region.

In Step 510, a capacitive baseline of a sensing region is determined in accordance with one or more embodiments. For example, where absolute capacitive sensing is performed, a processing system may compute or determine an absolute capacitive measurement of the background capacitance at a sensor electrode to form the capacitive baseline. When an input object is within a sensing region, this capacitive baseline may provide a measure of the difference in absolute capacitance between one or more sensor electrode(s) and the input object by analyzing the total absolute capacitance relative to the capacitive baseline. Likewise, a capacitive baseline may correspond to one or more capacitive profiles from various absolute capacitance measurements obtained for an axis along a sensor electrode pattern. In some embodiments, peaks or changes in curvature above a predetermined threshold relative to the capacitive baseline may be used to identify the location and/or type of input objects in a sensing region.

In Step 520, one or more resistance measurements of one or more sensor electrodes are obtained in accordance with one or more embodiments. The resistance measurements may be obtained in a similar manner as described above in Step 300 in FIG. 3 and the accompanying description. In some embodiments, a resistance measurement is obtained according to a predetermined delay. For example, transients may exist in resistive measurements, e.g., due to instability with a high gain amplifier, from input object capacitances in landing events and/or lifting events. A time delay in measuring the resistance until after an input object lifts from an input surface may provide for a resistance signal that corresponds closer to actual thermal drift.

Moreover, electrode resistances may change due to strains resulting from input forces applied to the region of the sensor electrode. As such, this side-effect may be avoided by using resistance measurements when no input objects are touching an input surface, which may determine using mutual capacitive sensing.

Figure 6:
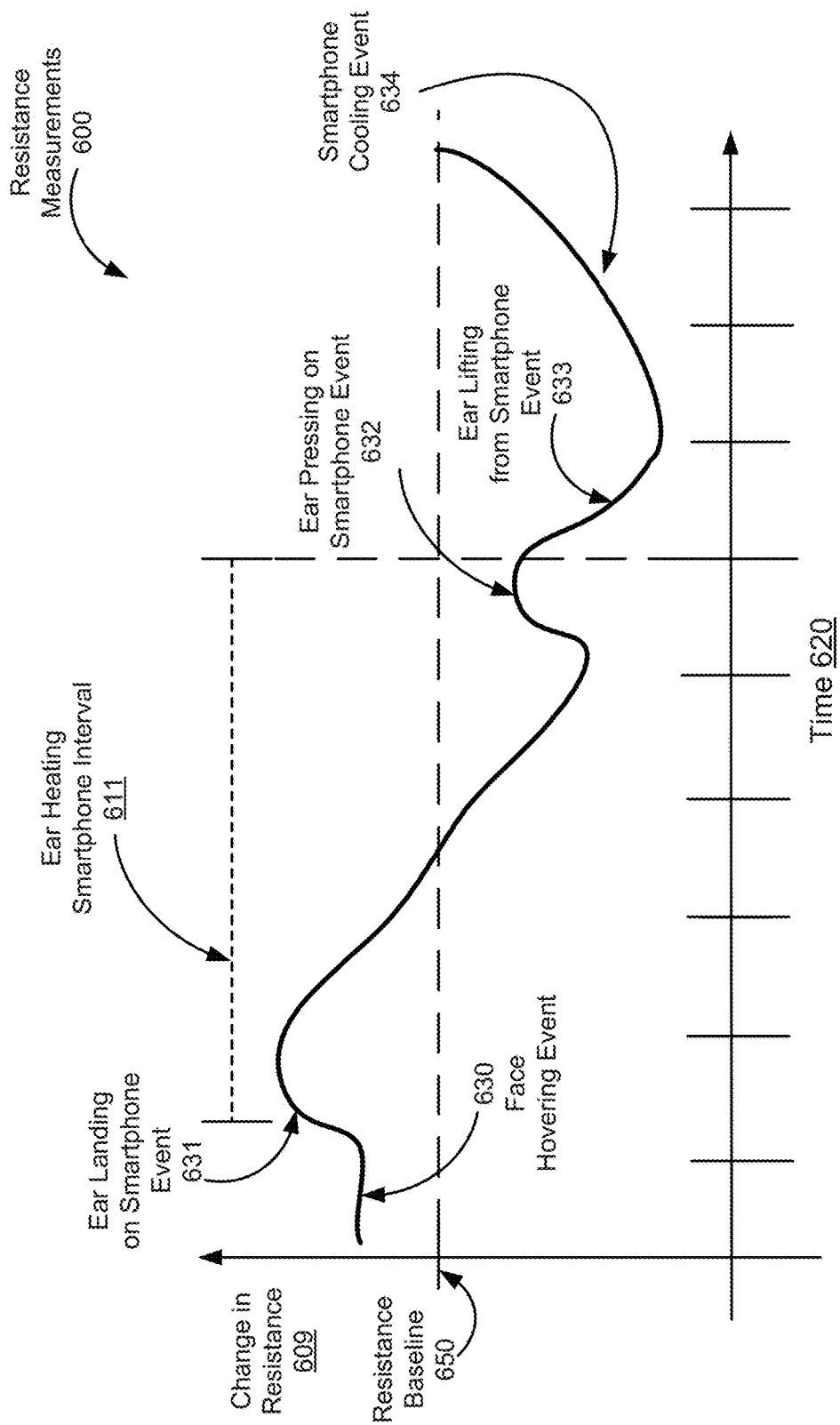
FIG. 6 shows example resistance measurements in accordance with one or more embodiments.

Turning to FIG. 6, FIG. 6 provides an example of resistance measurements produced by a user interacting with a smartphone. The following example is for explanatory purposes only and not intended to limit the scope of the disclosed technology.

FIG. 6 shows resistance measurements (600) where the vertical axis corresponds to change in resistance (609) at various sensor electrodes as a function of the horizontal axis corresponding to time (620). In particular, the change in resistance (609) is measured with respect to a resistance baseline (650) where resistance values above the resistance baseline (650) correspond to increasing amounts of resistance in the respective sensor electrodes while resistance values below the resistance baseline (650) correspond to decreasing amount of resistance. As shown in FIG. 6, various events may affect the measured resistance of the smartphone. First, a face hovering event (630) produces an increase in thermal drift and thus resistance above the resistance baseline (650). When the user's face contacts the smartphone, the contact produces a strain among the sensor electrodes and thereby increases resistance. This increase in resistance is show at the ear landing smartphone event (631). Next, during the ear heating smartphone interval (611), the ear acts as a heat source that produces a drop in resistance below the resistance baseline (650). However, upon ending a phone call with the smart phone, the user exerts a stress upon the smartphone during in the ear pressing smartphone event (632). Accordingly, an increase in resistance occurs in the ear pressing smartphone event (632). Then, the user removes his face during an ear lifting smartphone event (633) that removes the strain on the smartphone and thus produces a further drop in resistance in the respective sensor electrodes in the smartphone. Finally, upon the user's body departure from the smartphone, the smartphone undergoes a smartphone cooling event (634) where the smartphone returns to room temperature and resistance in the input device returns to the resistance baseline (650).

Returning to FIG. 5, in Step 530, changes in resistance of one or more sensor electrodes are determined using resistance measurements and a resistance baseline in accordance with one or more embodiments. A processing system may determine a delta-resistance signal by analyzing a resistance signal with respect to a resistance baseline. As such, the processing system may compute changes in resistance as a result of thermal drift in an input device. Likewise, the processing system may apply various signal processing techniques to the resistance measurements, e.g., by applying a filter, such as a Kalman filter, to correct a resistance estimate.

In Step 540, a capacitive baseline is adjusted using changes in resistance of one or more sensor electrodes in accordance with one or more embodiments. In particular, a processing system may analyze a change in resistance of one or more sensor electrodes in order to determine an adjusted capacitive baseline. For example, the adjusted capacitive baseline may be increased or decreased with respect to the original capacitive baseline using a gain factor similar to the gain factor described above in Step 320 and the accompanying description.

In Step 550, a capacitive response is obtained of a sensing region in accordance with one or more embodiments. The capacitive response may be obtained in a similar manner as described above in Step 310 and the accompanying description.

In Step 560, changes in capacitance of a sensing region are determined using a capacitive response and an adjusted capacitive baseline in accordance with one or more embodiments. Using an adjusted capacitive baseline, a processing system may compute changes in capacitance resulting from an input object being located in a sensing region of the input device.

In Step 570, object information regarding an input object is determined using changes in capacitance of a sensing region in accordance with one or more embodiments. Using the changes in capacitance, object information may be determined in a similar manner as described above in Step 330 in FIG. 3 and the accompanying description.

Figure 7:
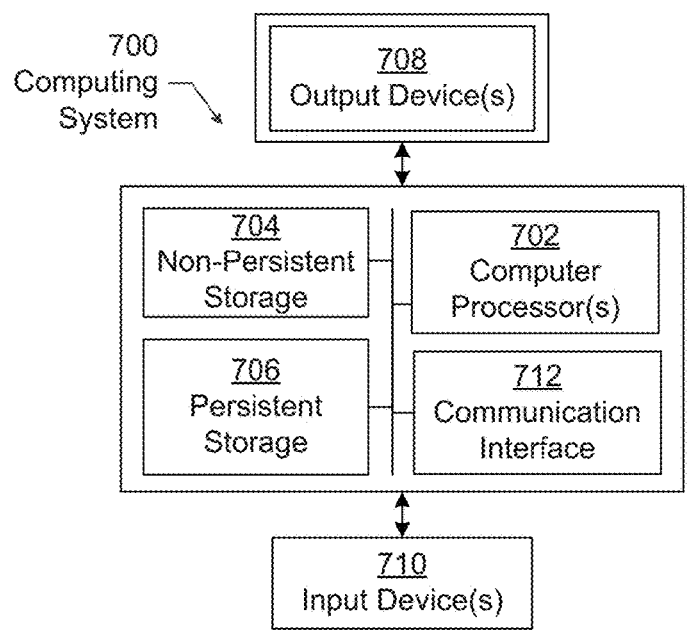
FIG. 7 shows a computing system in accordance with one or more embodiments.

Turning to FIG. 7, FIG. 7 shows an example computing system within which various embodiments may be implemented The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements to perform various functions.

The computer processor(s) (702) may be an integrated circuit for processing instructions. For example, the computer processor(s) (702) may include one or more cores or micro-cores. The computing system (700) may also include one or more input devices (710), such as a touchscreen, keyboard, mouse, microphone, touchpad, electronic pen, or other types of input devices.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display devices), a printer, external storage, or other output devices. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (700) in FIG. 7. First, the organizing pattern (e.g., grammar, schema, layout) of the data is determined, which may be based on one or more of the following: position (e.g., bit or column position, $N_{th}$ token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7, while performing one or more embodiments of the disclosed technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 7 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7. Other functions may be performed using one or more embodiments of the disclosed technology.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A processing system, comprising:
sensor circuitry configured to:
obtain a first plurality of resistance measurements of a sensor electrode in an input device, wherein the first plurality of resistance measurements correspond to electrical resistance values across the sensor electrode, and
obtain a capacitive response using a plurality of sensor electrodes in the input device, wherein the capacitive response corresponds to a plurality of changes in capacitance in response to an input object being located in a sensing region; and
a determination module coupled to the sensor circuitry, the determination module configured to:
determine a first adjusted capacitive response using the first plurality of resistance measurements and the capacitive response, and
determine, using the first adjusted capacitive response, object information regarding the input object in the sensing region.

2. The processing system of claim 1, wherein the sensor circuitry is further configured to obtain a second plurality of resistance measurements of the sensor electrode when no input object is present in the sensing region, and wherein the determination module is further configured to:
determine, using the second plurality of resistance measurements, a resistance baseline; and
determine a plurality of changes in resistance between the first plurality of resistance measurements and the resistance baseline,
wherein the capacitive response is adjusted to correct for the plurality of changes in resistance.

3. The processing system of claim 2, wherein the determination module is further configured to adjust a capacitive baseline using the plurality of changes in resistance to obtain an adjusted capacitive baseline, and wherein the adjusted capacitive baseline is used with the capacitive response to determine the object information.

4. The processing system of claim 1,
wherein the input object is a face of a user,
wherein the first plurality of resistance measurements correspond to the face hovering over the input device and heating the input device, and
wherein the first adjusted capacitive response compensates the capacitive response for changes in capacitance produced by the face heating the input device.

5. The processing system of claim 1,
wherein the plurality of sensor electrodes correspond to a diamond sensor electrode pattern,
wherein the sensor electrode is a bifurcated electrode among the plurality of sensor electrodes, and
wherein the bifurcated electrode is configured for a first mode that transmits a sensing signal for a transcapacitive scan and a second mode that measures resistance across the bifurcated electrode.

6. The processing system of claim 1,
wherein the capacitive response is an absolute capacitive scan of the sensing region, and
wherein the capacitive response corresponds to changes in a variable capacitance between the input object and one or more receiver electrodes among the plurality of sensor electrodes.

7. The processing system of claim 1, wherein the sensor circuitry is further configured to:
transmit a sensing signal along a transmitter electrode;
obtain a resulting signal from a receiver electrode among the plurality of sensor electrodes in response to transmitting the sensing signal;
obtain a second plurality of resistance measurements for the transmitter electrode; and
obtain a third plurality of resistance measurements for the receiver electrode,
wherein the determination module is further configured to determine a second adjusted capacitive response using the resulting signal, the second plurality of resistance measurements, and the third plurality of resistance measurements.

8. The processing system of claim 1,
wherein the first plurality of resistance measurements are obtained by the sensor circuitry only when no input force is applied by the input object to an input surface.

9. The processing system of claim 1,
wherein the sensor electrode is different from the plurality of sensor electrodes.

10. The processing system of claim 1,
wherein the object information corresponds to positional information of the input object, a type of the input object, or a size of the input object.

11. The processing system of claim 1,
wherein the plurality of sensor electrodes comprise a matrix electrode array, and
wherein the matrix electrode array comprises a respective sensor electrode with two routing traces that are configured to measure resistance across the respective sensor electrode.

12. The processing system of claim 1, wherein the determination module is further configured to report the object information to a host device, wherein the object information is configured to trigger an interface action in a graphical user interface on the host device.

13. An input device, comprising:
a plurality of sensor electrodes comprising a sensor electrode; and
a processing system coupled to the plurality of sensor electrodes, the processing system configured to:
obtain a first plurality of resistance measurements of the sensor electrode, wherein the first plurality of resistance measurements correspond to electrical resistance values across the sensor electrode;

obtain a capacitive response using the plurality of sensor electrodes, wherein the capacitive response corresponds to a plurality of changes in capacitance in response to an input object being located in a sensing region;

determine an adjusted capacitive response using the first plurality of resistance measurements and the capacitive response; and determine, using the adjusted capacitive response, object information regarding the input object in the sensing region.

14. The input device of claim 13, wherein the processing system is further configured to:

obtain a second plurality of resistance measurements of the sensor electrode when no input object is present in the sensing region;

determine, using the second plurality of resistance measurements, a resistance baseline; and determine a plurality of changes in resistance between the first plurality of resistance measurements and the resistance baseline, wherein the capacitive response is adjusted to correct for the plurality of changes in resistance.

15. The input device of claim 14, wherein the processing system is further configured to adjust a capacitive baseline using the plurality of changes in resistance to obtain an adjusted capacitive baseline, and wherein the adjusted capacitive baseline is used with the capacitive response to determine the object information.

16. The input device of claim 13, further comprising:

a bifurcated electrodes comprising a first electrode terminal and a second electrode terminal; and a switch coupled to the first electrode terminal and the second electrode terminal, wherein the switch is configured to short-circuit the first electrode terminal and the second electrode terminal for transmitting a sensing signal for a transcapacitive scan, and wherein the switch is configured to produce an open-circuit between the first electrode terminal and the second electrode terminal to measure resistance across the bifurcated electrode.

17. A method, comprising:

obtaining a first plurality of resistance measurements of a sensor electrode in an input device, wherein the first plurality of resistance measurements correspond to electrical resistance values across the sensor electrode;

obtaining a capacitive response using a plurality of sensor electrodes in the input device, wherein the capacitive response corresponds to a plurality of changes in capacitance in response to an input object being located in a sensing region;

determining an adjusted capacitive response using the first plurality of resistance measurements and the capacitive response; and determining, using the adjusted capacitive response, object information regarding the input object in the sensing region.

18. The method of claim 17, further comprising:

obtaining a second plurality of resistance measurements of the sensor electrode when no input object is present in the sensing region;

determining, using the second plurality of resistance measurements, a resistance baseline; and determining a plurality of changes in resistance between the first plurality of resistance measurements and the resistance baseline, wherein the capacitive response is adjusted to correct for the plurality of changes in resistance.

19. The method of claim 18, further comprising:

adjusting a capacitive baseline using the plurality of changes in resistance to obtain an adjusted capacitive baseline, and wherein the adjusted capacitive baseline is used with the capacitive response to determine the object information.

20. The method of claim 17, further comprising:

reporting the object information to a host device, wherein the object information is configured to trigger an interface action in a graphical user interface on the host device.

* * * * *